Dec. 22, 1931.     V. K. ZWORYKIN     1,837,744
PHOTO ELECTRIC TUBE
Original Filed May 20, 1926
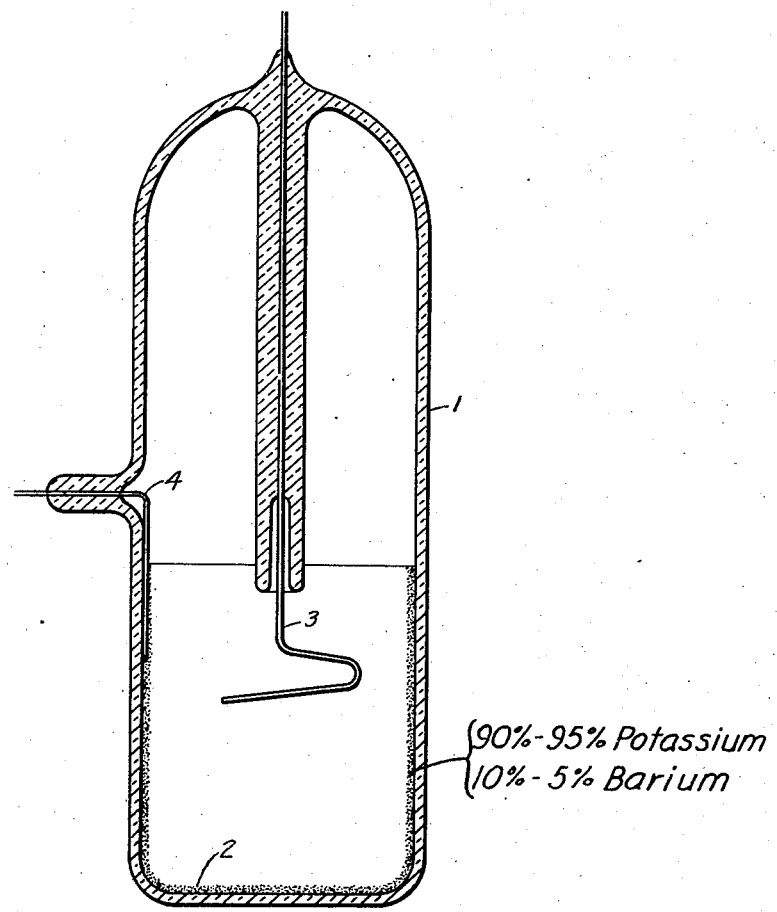
INVENTOR
Vladimir K. Zworykin
BY
ATTORNEY Patented Dec. 22, 1931

1,837,744

UNITED STATES PATENT OFFICE

VLADIMIR K. ZWORYKIN, OF SWISSVALE, PENNSYLVANIA, ASSIGNOR TO WESTINGHOUSE ELECTRIC & MANUFACTURING COMPANY, A CORPORATION OF PENNSYLVANIA

PHOTO-ELECTRIC TUBE

Application filed May 20, 1926, Serial No. 110,575. Renewed June 7, 1929.

My invention relates to methods and materials employed in the construction of photoelectric cells and it has particular reference to the manufacture of photoelectrically active electrodes to be used therein.

Since the discovery that certain substances would emit electrons when exposed to the action of light, there has been but little improvement in the manufacture of photoelectric cells employing metals of the alkali group, such as sodium, potassium, rubidium and cæsium as the photoelectrically active material.

In the Physikalische Zeitschrift, No. 15, August 1911, 12 Jahrgang, Physkialische Zeitschrift XI, 1910, Elster and Geitel described a method for the preparation of such cells, which is essentially that in general use today. The steps involved in this method are substantially as follows:

The cell, which is provided with two electrodes is first evacuated. A small amount of potassium is then so distilled from a side container over on the interior of the cell, that it deposits on the walls in contact with one of the electrodes. Hydrogen is next admitted, and an electrical discharge is caused to occur between the electrode and the potassium coating. The hydrogen combines chemically with the potassium, producing a substance much more sensitive to light than pure potassium. By heating one portion of the cell, the potassium may be driven off, leaving a transparent window for the entry of the light to be measured. If desired, a final evacuation may now be given the device.

While such a method will undoubtedly result in a cell which is useful, during the final evacuation of the device, the photoelectrically active material may re-distill by reason of its low melting point. Potassium, for example, has a melting point of only 62.5 degrees C., while cæsium, which has not previously been used to any great extent, has a melting point of 25 degrees C.

Because of this danger of redistillation, the photoelectric cells now in use are made with a complicated electrode and press in order to prevent the redistilled metal from bridging the electrodes when in use. Nevertheless, they must at all times be handled carefully, and guarded against being overheated.

Insofar as I am aware, no one has, as yet, succeeded in producing a substance having a comparatively high melting point, which at the same time, is sufficiently active photoelectrically to be of value in devices designed for very quick response to light variations.

It is, accordingly, an object of my invention to provide a substance which has a comparatively high melting point and is extremely sensitive to light variations.

Another object is to provide a method whereby the desired photoelectric substance may be made on a commercial scale in an inexpensive manner.

A further object of my invention is to provide material for the active electrode of photoelectric device and which is a solid at temperatures in the neighborhood of 100° C.

These objects I attain in a new and novel manner by bringing together, at the temperature of liquid air, predetermined percentages of the photoelectric active material, which has a low melting point, and another element having a much higher melting point and then causing the temperature to be raised to a point at which the two elements will melt and amalgamate.

More specifically, in the preferred form of my invention, I mix with sodium, potassium, or other active element, a small percentage of barium or other element of the alkaline earth group, having a melting point considerable above that of the said active material. I have found that a particularly sensitive alloy may be made by employing from 90 to 95% of potassium, together with 10 to 5% of barium, the latter having a melting point in the neighborhood of 650° C. This results in an alloy which has a melting point somewhere in the neighborhood of 100° C., a temperature which need not be exceeded in the process of exhausting the finished device. The melting point of the alloy depends upon the percentage of barium, being higher as this percentage is increased. Too great a proportion of barium is detrimental, however, since the light sensitivity decreases with an increased amount thereof. Within the percentages given the alloy is, for all practical purposes, just as sensitive as metallic potassium alone.

With the foregoing principles in mind, the single figure of the accompanying drawing shows a photoelectric cell adapted to embody my invention. It comprises a glass container 1 having, on its interior wall, a coating 2 of photoelectric material, which is the subject matter of my invention. Sealed through the wall of the tube 1, in a manner well known in the art, is a cooperating electrode 3. An inleading wire 4 extends through the wall of the tube and makes contact with the coating 2. While a tube of the foregoing character may be employed in connection with the photoelectric substance of my invention, it will be evident that the latter is not limited to this particular tube structure, but that other forms of enclosing vessel well known in the art will also be suitable.

My preferred method of preparing my new photoelectric substance is as follows: About 1 or 1.5 grams of pure metallic potassium is further purified by repeated distillation in a vacuum from one section of a glass device to another, the impurities tending to remain in the portions of the device from which the metal has been driven off. Approximately .5 grams of barium is next treated in the same manner, the distillation being repeated until it is reasonably certain that only the pure metal is left.

Both the potassium and barium are then chilled to the temperature of liquid air and are placed together while cold in a receptacle which is carefully exhausted. The temperature is then raised to 400° C., which causes the two elements to unite or amalgamate into a substance or alloy, which, as stated previously, will have a melting point somewhere in the neighborhood of 100° C. A desired portion of this alloy is then distilled over onto the interior surface of the tube in which it is to be employed and the tube permitted to cool down to room temperature.

It is now feasible to exhaust the tube in the usual and well-known manner, with the assurance that none of the photoelectric substance will be undistilled in the finished cell. Such portions of the alloy-covered surface which are desired clear may be heated and the alloy driven off, as is usually done when manufacturing photoelectric cells according to previously known methods.

It is of interest to note at this point that any of the active metals of the alkali group or the alkaline earth group may be quite safely handled in open air for a considerable time without danger of oxidation if they have been previously chilled to the temperature of liquid air (−180° C.)

Probably the most important advantage attendant upon the practice of my invention is the ease with which a high vacuum may be attained in devices wherein my new alloy is employed as the photoelectrically active electrode. No elaborate precautions are necessary to prevent the alloy from distilling off during evacuation nor in the usual course of events will the device become filled with potassium vapor while in use. These advantages are due to the fact that my new alloy has, as before stated, a melting point which is high in comparison to that of the photoelectrically active constituent thereof.

Since less care is required in preparing devices employing my new alloy, the cost of manufacturing is accordingly reduced, while the quality of the finished product may be kept in all respects equal to, if not better, than when potassium alone is used.

Numerous other combinations of photoelectrically active elements having low melting points with alloying agents in order to secure a substance having the desired electrical and physical characteristics will suggest themselves to those skilled in the art to which my invention pertains. Such combinations I consider as falling within the range of equivalents to which I am entitled and my invention is not to be limited except insofar as is required by the prior art and the scope of the following claims.

I claim as my invention:

1. A photoelectric substance comprising an element of the alkaline earth group and an element of the alkali group.

2. A photoelectric substance comprising barium and potassium.

3. A photoelectric substance comprising an element of the alkaline earth group and an element of the alkali group, the substance having a melting point of approximately 100° C.

4. A composite material comprising a photo-active element having a melting point below one hundred degrees centigrade and a second element having a melting point of approximately six hundred degrees centigrade.

5. A photoelectric alloy comprising potassium and having a melting point of approximately one hundred degrees centigrade.

6. A photoelectric composite material having a melting point above that of a photoelectrically active constituent thereof.

7. A photoelectric material having a melting point of approximately one hundred degrees centigrade.

8. The method of preparing a photoelectric compound which comprises separately distilling the constituent elements in vacuo, chilling the distillates to the temperature of liquid air, adding the chilled elements together in vacuo, and then applying heat.

9. A photoelectric substance comprising from 90% to 95% potassium and from 10% to 5% barium.

In testimony whereof, I have hereunto subscribed my name this 11th day of May, 1926.

VLADIMIR K. ZWORYKIN.